(12) United States Patent
Werner et al.

(10) Patent No.: US 8,566,655 B2
(45) Date of Patent: Oct. 22, 2013

(54) METHOD FOR OPERATING A COMMUNICATION SYSTEM HAVING A PLURALITY OF NODES, AND A COMMUNICATION SYSTEM THEREFOR

(75) Inventors: Michael Werner, Cologne (DE); Bernd Mueller, Leonberg (DE); Carsten Gebauer, Boeblingen (DE); Manfred Spraul, Stuttgart (DE)

(73) Assignee: Robert Bosch GmbH, Stuttgart (DE)

(*) Notice: Subject to any disclaimer, the term of this patent is extended or adjusted under 35 U.S.C. 154(b) by 189 days.

(21) Appl. No.: 12/998,110

(22) PCT Filed: Mar. 6, 2009

(86) PCT No.: PCT/EP2009/052656
§ 371 (c)(1),
(2), (4) Date: Jul. 5, 2011

(87) PCT Pub. No.: WO2010/031599
PCT Pub. Date: Mar. 25, 2010

(65) Prior Publication Data
US 2011/0264974 A1    Oct. 27, 2011

(30) Foreign Application Priority Data
Sep. 17, 2008 (DE) .......................... 10 2008 042 172

(51) Int. Cl.
*G06F 11/00* (2006.01)
(52) U.S. Cl.
USPC .......................................... 714/704; 714/774
(58) Field of Classification Search
None
See application file for complete search history.

(56) References Cited

U.S. PATENT DOCUMENTS

| | | | |
|---|---|---|---|
| 4,908,784 A * | 3/1990 | Box et al. | 702/176 |
| 5,253,126 A * | 10/1993 | Richmond | 360/53 |
| 5,815,508 A * | 9/1998 | Wadzinske et al. | 714/704 |
| 6,442,708 B1 * | 8/2002 | Dierauer et al. | 714/25 |
| 6,445,719 B1 * | 9/2002 | Schneider et al. | 370/506 |
| 6,920,598 B2 * | 7/2005 | Chen et al. | 714/748 |
| 6,959,406 B2 * | 10/2005 | Goldsack et al. | 714/704 |
| 6,981,183 B2 * | 12/2005 | Kim | 714/704 |
| 2002/0083378 A1 | 6/2002 | Nickels | |
| 2004/0243889 A1 * | 12/2004 | Li et al. | 714/704 |

FOREIGN PATENT DOCUMENTS

WO    WO 03/067804    8/2003

OTHER PUBLICATIONS

Zetik, Rudolf. "Correlation Between MIMO Link Performance Evaluation Results and Characteristic Channel Parameters". Electronic Measurement Research Lab, Ilmenau University of Technology, Germany, Jan. 2004.*
ISO Standard 11898-1 "Road Vehicles—Controller Area Network (CAN)—Part 1: Data Link Layer and Physical Signaling".
ISO Standard 11898-1, "Road Vehicles—Controller Area Network (CAN)—Part 1: Data Link Layer and Physical Signaling".

* cited by examiner

*Primary Examiner* — Steve Nguyen
(74) *Attorney, Agent, or Firm* — Kenyon & Kenyon LLP

(57) ABSTRACT

In a method for operating a communication system having a plurality of nodes which have access to a shared channel, a transmission process for transmitting a message via the channel is monitored for bit errors, and when a bit error occurs, a signaling message is transmitted via the channel in order to signal the bit error. In order to allow communications processes between the nodes to be controlled as a function of a bit error rate of the channel, a signaling rate of the signaling messages is measured and a bit error rate of the channel is determined as a function of the signaling rate.

19 Claims, 3 Drawing Sheets

METHOD FOR OPERATING A COMMUNICATION SYSTEM HAVING A PLURALITY OF NODES, AND A COMMUNICATION SYSTEM THEREFOR

BACKGROUND OF THE INVENTION

1. Field of the Invention

The present invention relates to a method for operating a communication system having a plurality of nodes, which have access to a shared channel of the communication system; in the method, a transmission process for transmitting a message via the channel is monitored for bit errors, and if a bit error occurs, a signaling message is transmitted via the channel in order to signal the bit error.

2. Description of Related Art

In the ISO standard 11898-1, "Road Vehicles—Controller Area Network (CAN)—Part 1: Data Link Layer and Physical Signaling", the data link layer of the controller area network (CAN) as well as the signaling are specified in the physical layer of the CAN. This standard specifies signaling messages, referred to as error frames, for signaling a bit error that has occurred in the course of a data transmission. In addition, it is specified in the standard that nodes detect the individual occurring error frames and switch between different states as a function of the detected error frames.

A disadvantage of the known CAN protocols is that their use does not allow a sufficiently precise adaptive communication control as a function of a current bit error rate of the channel. When planning a CAN domain, an estimated bit error rate of the channel must therefore be taken into account.

BRIEF SUMMARY OF THE INVENTION

It is an object of the present invention to provide a method for operating a communication system having a plurality of nodes that are interconnected via a shared channel, the method allowing a control of communication processes between the nodes as a function of a current bit error rate of the channel.

According to the present invention, it was recognized that an evaluation of the signaling messages provides a simple means for estimating a current bit error rate of the channel, thereby dispensing with the need to expand any protocols of the communication system for such a purpose. The method is therefore easy to realize, and a communication system operated on the basis of the method according to the present invention remains compatible with conventional communication systems. Furthermore, the method does not require any additional messages that must be transmitted via the channel. As a result, the channel is not subjected to further loading when the method is executed. Moreover, this is a digital method for which no estimates of analog variables such as a signal-to-noise ratio are required. The method is particularly suitable for determining the current bit error rate in fast communication systems (e.g., in the telecommunications field). The method is used especially in communication systems in which all communication participants are able to observe responses to bit errors in the bit stream. Statistics are kept about the monitored responses in order to then determine the current bit error rate on this basis. The transmission of the messages via the communication system preferably takes place in data frames. The current bit error rate is able to be determined in one or a plurality of communication participant(s) of the communication system, preferably in all of them.

It is especially preferred if the bit error rate is determined as a function of a channel occupancy of the channel and a capacity of the channel. This takes a dependency of the signaling rate on a useful data rate into account. In such a case it is also possible to utilize a predefined value as channel occupancy. For example, a full occupancy of the channel may be assumed.

An undesired influence of the channel occupancy on a value of the estimated bit error rate may be eliminated in fairly effective manner in that the channel occupancy is determined by measuring a message rate of messages transmitted via the channel, preferably of messages transmitted without errors. In the process, a length of the individual transmitted messages may be recorded in addition, or an average message length or a previously known message length may form the basis for determining the channel occupancy. This makes it possible to determine the value of the bit error rate largely independently of the current channel occupancy; in other words, fluctuations in the channel occupancy falsify the value of the determined bit error rate only negligibly at most. The provided restriction of the measurement of the message rate to messages transmitted without error simplifies the method without any noticeable detrimental effect on the accuracy of this measurement and thus the accuracy of the determined bit error rate.

Furthermore, it is conceivable to consider only a portion of the messages transmitted via the channel when determining the channel occupancy. For example, only a useful data portion or only a message header, especially only an arbitration portion, of the message may be considered.

According to one preferred specific embodiment of the present invention, an average bit error rate of all transmission processes is determined as bit error rate. This makes it possible to realize the method with little outlay because only one value for the bit error rate must be held in reserve and thus relatively little memory space is required for executing the method.

As an alternative or in addition, it may be provided that the bit error rate of the particular transmission processes in which the message is output by a particular node is determined as bit error rate. A plurality of values for the bit error rate and/or additional statistical quantities may be held in reserve, which values are assigned to different specific nodes. Preferably, the bit error rate is determined for each node of the communication system. Although any node connected to the communication system is able to determine the bit error rate of the transmissions transmitted by the particular node by monitoring these transmissions, it is preferred if the specific node determines the bit error rate of the particular transmissions it has conducted itself. Overall, more precise information about the communication conditions of this node is made available due to the fact that the bit error rate is determined for the specific node.

It has shown to be advantageous if the bit error rate of the channel is determined for a specific time interval. It is therefore preferred if a time interval is specified for which the bit error rate is determined, preferably via a start command for starting the interval and a stop command for stopping the interval.

In an especially preferred manner, a communication behavior of at least one node is adapted as a function of the determined bit error rate. In this way it is possible to dynamically adapt the communication system to the temporally varying bit error rate. If the bit error rate is relatively high at a specific point in time, then one or a plurality of node(s) may choose for its transmissions a format of useful data blocks in which a percentage of check bits of the entire useful data block is relatively high, so that a relatively low residual error probability is achieved in the transmission despite the high bit error rate. In general, an instant and the content of an individual transmission are able to be adapted as a function of the determined bit error rate. At a high bit error rate, for example, relatively unimportant and not time-critical transmissions may be postponed, so that overloading of the communication system due to a useful data rate of the channel that is reduced on account of the high bit error rate is avoided. It may also be the case that transmissions that are unable to be adapted to an increased bit error rate, as they occur, for example, in applications having a low error tolerance time, are avoided as long as the bit error rate is relatively high. As a consequence, the communication system need no longer be set up based on an assumed, relatively conservatively estimated bit error rate in terms of statistics, so that the useful data throughput of the communication system is increased because complex safeguarding measures against the bit errors must be used only in cases where the bit error rate is high.

The communication system may be a bus system, preferably a bus system used in automotive technology, such as a CAN domain, for instance.

In an especially preferred manner, the communication system, especially the monitoring means and the signaling means, are set up for executing a method according to the present invention as described above.

Moreover, it is preferred if at least one node, preferably a plurality of nodes or all nodes, encompass(es) the measuring device. That is to say, a plurality of measuring devices is able to be provided, which devices are assigned to different nodes or are disposed within these nodes. The bit error rate may therefore be determined by a plurality, or all, nodes of the communication system. This results in a communication system in which the bit error rate is determined at multiple locations of the system, and therefore in an error-tolerant manner.

In this context it is conceivable that the measuring device is integrated in a communication controller of the node. If the communication system is a CAN domain, for instance, a CAN controller which is expanded by the measuring device, may be provided as communication controller. A device of the communications controller for detecting the signaling message in the form of the error frame provided by the CAN protocols, which is required anyway, may be utilized by the measuring device as well.

It may also be the case that the measuring device is implemented as a separate component, preferably in the form of an ASIC. This makes it possible to use conventional components in the communication system according to the present invention, such as conventional communication controllers, for example.

DETAILED DESCRIPTION OF THE INVENTION

Figure 1:
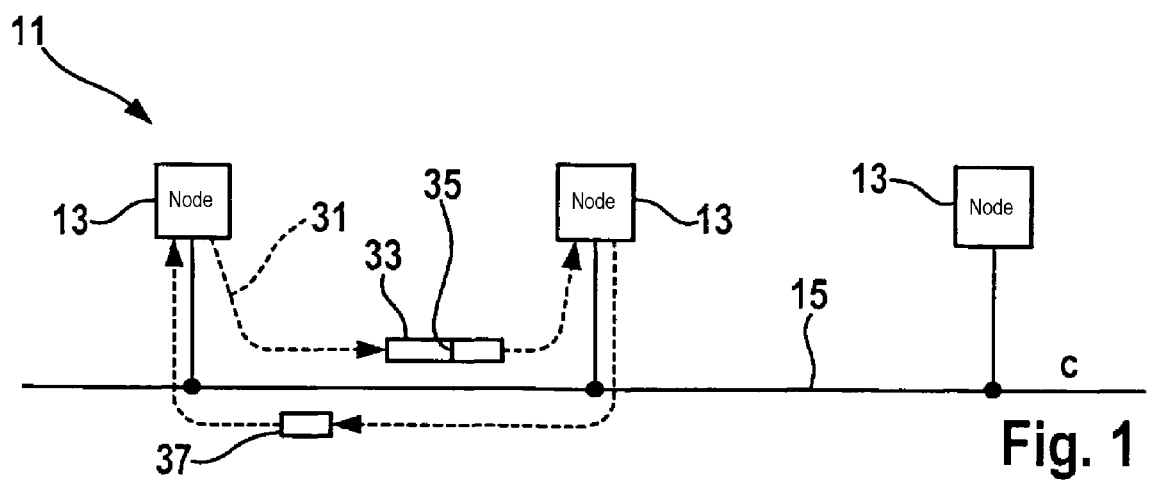
FIG. 1 shows a schematic representation of a communication system according to a preferred specific embodiment of the present invention.

FIG. 1 shows a communication system 11, which has a plurality of nodes 13, which nodes are connected to a shared bus line 15. Communication system 11 is a CAN domain, and bus line 15 forms a shared channel of communication system 11, to which all nodes 13 have access. A channel capacity c of bus line 15 amounts to c=500 kbit/s in the illustrated embodiment.

Figure 2:
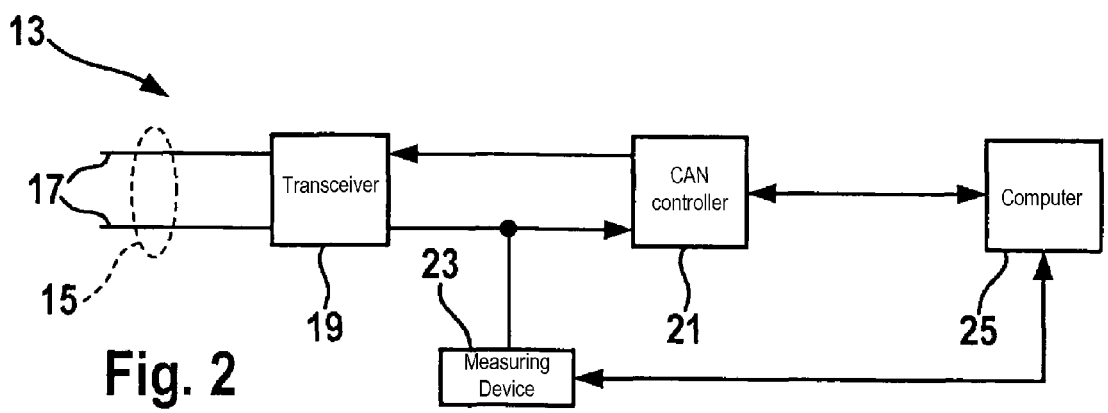
FIG. 2 shows a schematic illustration of a node of the communication system from FIG. 1.

FIG. 2 shows one possible configuration of node 13. As usual in the case of a CAN, it is obvious that bus line 15 includes a wire pair 17 for the data transmission between nodes 13. Wire pair 17 of bus line 15 is connected to a CAN transceiver 19 of node 13. An output of CAN transceiver 19 is connected to an input of a CAN controller 21 of node 13. An output of CAN controller 21 is connected to an input of CAN transceiver 19.

Furthermore, node 13 has a measuring device 23 for determining a bit error rate. An output of measuring device 23 is also connected to the output of CAN transceiver 19.

Finally, node 13 has a microcomputer implemented as microcontroller 25, to which CAN controller 21 and measuring device 23 are connected.

In the specific embodiment shown in FIG. 2, measuring device 23 is implemented as a separate component, in the form of an ASIC. Deviating therefrom, measuring device 23 may also be developed as a programmable logic component (PLD), which is programmed accordingly.

Figure 3:
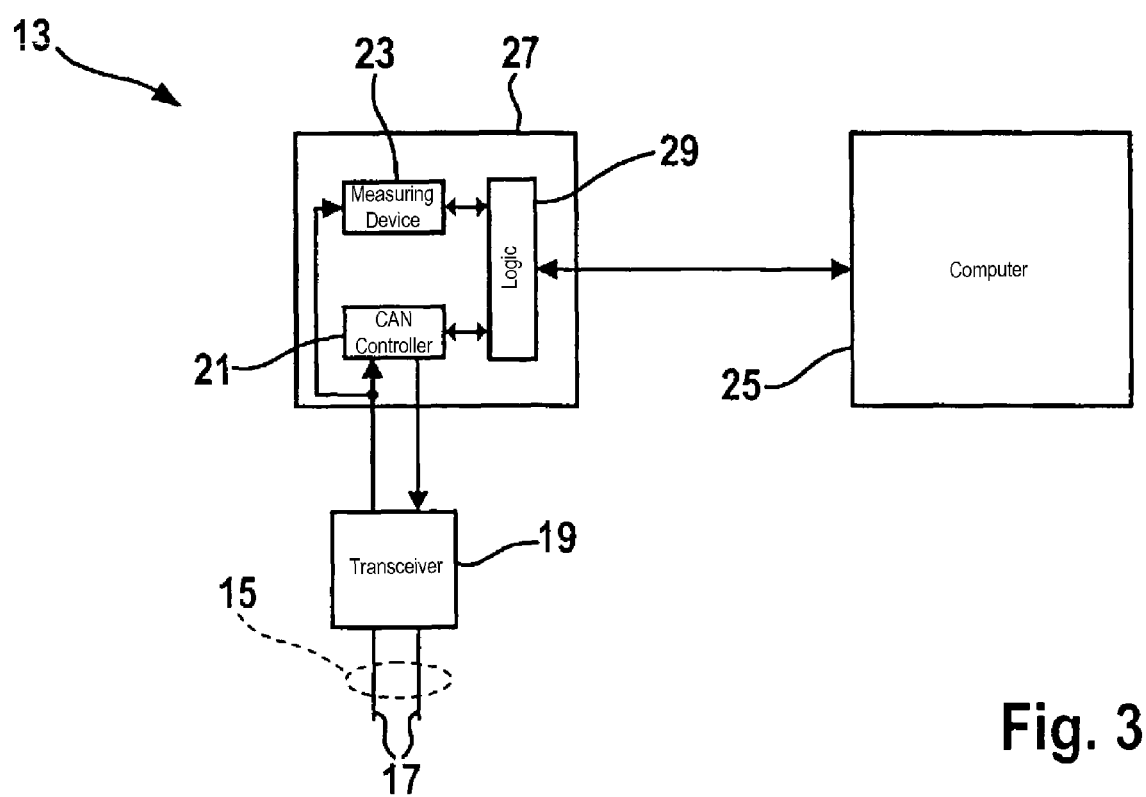
FIG. 3 shows a schematic illustration of a node according to a second preferred specific development.

FIG. 3 shows another example of a node 13, in which CAN controller 21 and measuring device 23 are integrated in a single periphery component 27. The connection of individual components 19, 21 and 23 of node 13 to each other corresponds to the aforementioned interconnection of components 19, 21 and 23 of node 13 shown in FIG. 2. However, CAN controller 21 and measuring device 23 are not separated from each other, but connected to microcontroller 25 via an interface logic 29. Periphery component 27 may be implemented as an integrated circuit such as an ASIC or also as a PLD programmed accordingly.

When communication system 11 is in operation, individual nodes 13 transmit messages in the form of data frames 33 via bus line 15 according to the CAN protocols.

Such a data frame 33 includes a message header having an arbitration component, and may have a useful data field for the transmission of useful data. A corresponding transmission process 31 is schematically illustrated in FIG. 1 in the form of a dashed arrow, and a transmitted data frame 33 is shown in schematic manner as well, as a rectangle 33. The structure of data frame 33 corresponds to the specifications of the generally known and standardized CAN protocols. Data frame 33 sketched in FIG. 1 has a bit error 35. As soon as one of nodes 13 detects bit error 35, it outputs a signaling message in the form of an error frame 37 in order to indicate bit error 35 to all nodes 13 via bus line 15.

Within nodes 13, a useful data block to be transmitted is provided by microcontroller 25 to CAN controller 21, and CAN controller 21 packages the useful data block into a suitable data frame 33 and transmits it to CAN transceiver 19, which then outputs data frame 33 via wire pair 17 of bus line 15. For the reception of data via bus line 15, CAN transceiver 19 analyzes signals at wire pair 17 of bus line 15 and generates at its output a signal that corresponds to a received data frame 33 or a received error frame 37, making it available to CAN controller 21 as well as measuring device 23. CAN controller 21 carries out data processing steps according to the CAN protocols and forwards the useful data block transmitted via data frame 33 to microcontroller 25. Application programs running on microcontroller 25 are able to carry out further processing of useful data contained in the useful data block and, if applicable, send useful data, which possibly have to be transmitted to other nodes 13 in the form of a further useful data block, to CAN controller 21.

Since measuring device 23 is connected at the output of transceiver 19, all data frames 33 and error frames 37 transmitted via bus line 15 are transmitted to measuring device 23. Measuring device 23 calculates a bit error rate of the channel provided by bus line 15 by counting the error frames 37 transmitted to measuring device 23. Microcontroller 25 reads out the calculated bit error rate from measuring device 23, so that a communication behavior of application programs executed by microcontroller 25 is able to be adapted.

Figure 4:
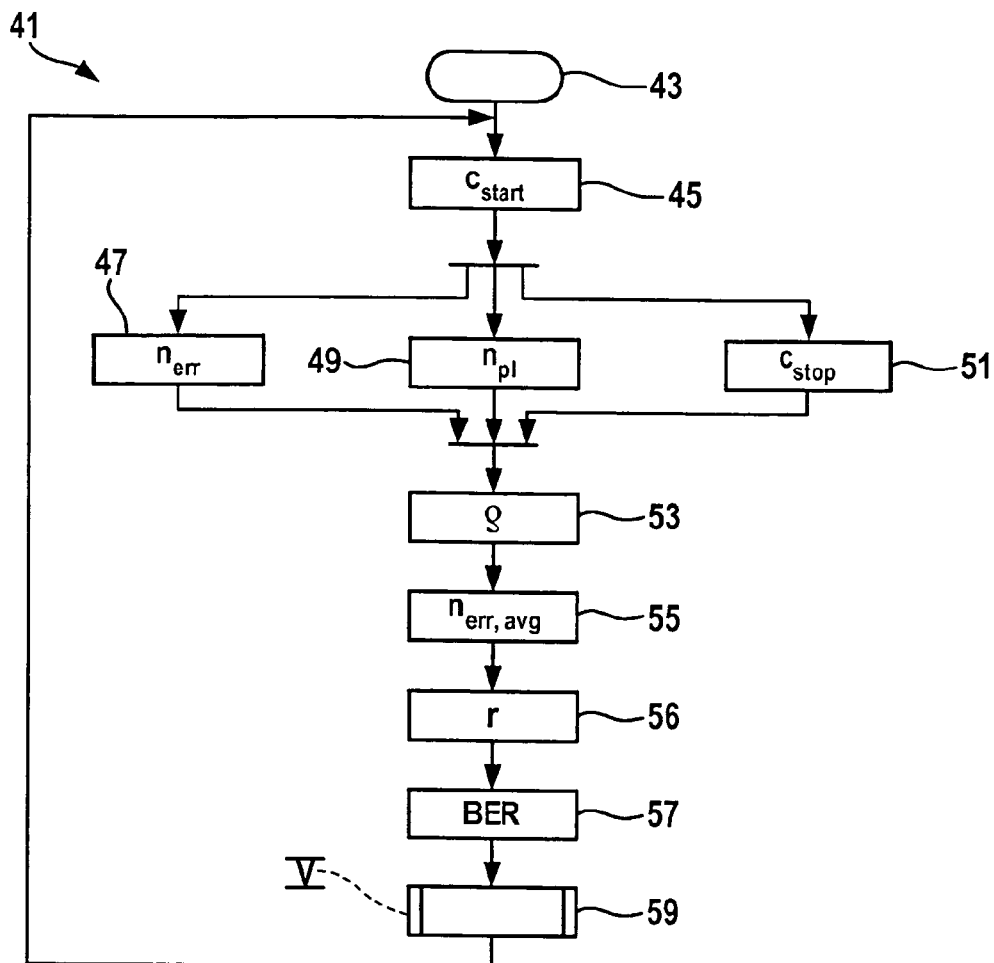
FIG. 4 shows a flow chart of a method for operating the communication system from FIG. 1.

In the following, a method 41 for operating communication system 11, especially for determining the bit error rate and for adapting the communication behavior, is described in greater detail using FIGS. 4 and 5. Following a start 43 of method 41, a wait step 45 is implemented in which a wait takes place for a start command $c_{start}$, which is generated by microcontroller 25.

As soon as measuring device 23 has received start command $c_{start}$, a first measuring operation 47, a second measuring operation 49, and a wait operation 51 take place simultaneously. During first measuring operation 47, measuring device 23 determines a number $n_{err}$ of error frames 37 it has received via its input during a measuring interval t. During second measuring operation 49, measuring device 23 determines a number $n_{pl}$ of data frames 33 it has received without errors during measuring interval t. In so doing, it is even possible to determine an average length of data frames 33 in second measuring operation 49, or the individual lengths of received data frames 33. During wait operation 51, measuring device 23 waits for a stop command $c_{stop}$ to be transmitted from microcontroller 25 to measuring device 23. As soon as measuring device 23 has received stop command $c_{stop}$, it terminates operations 47, 49, 51 and starts the processing of a step 53.

A duration of measuring interval t for which the two measuring operations 47, 49 are implemented, thus is defined by a time interval between start command $c_{start}$ and stop command $c_{stop}$. In one specific embodiment, which is not shown here, the duration of measuring interval t is fixedly specified, i.e., there is a wait for a specified period of time in the course of operation 51, before operations 47, 49 and 51 are terminated. In this case it is also possible to dispense with wait step 45, so that operations 47, 49, 51 are repeated at regular intervals for the specified period of time, without microcontroller 25 having to send commands $c_{start}$ or $c_{stop}$ to measuring device 23 for this purpose.

In step 53, a bus occupancy p is determined as a function of the ascertained number $n_{pl}$ of data frames 33 that was transmitted successfully, i.e., transmitted without bit errors 35. Bus occupancy p denotes the relative utilization period of bus line 15 for a bit transmissions, especially transmissions of data frames 33 or error frames 37. Frames 33 transmitted with bit error 35 as well as error frames 37 are disregarded for the sake of simplicity. That is to say, only data frames 33 that were transmitted without errors are taken into account when determining bus occupancy p. However, data frames 33 transmitted with bit error 35, and error frames 37 are able to be taken into account in another specific embodiment.

In a step 55 that follows step 53, an average value $n_{err,avg}$ of received error frames 37 is formed. Average value $n_{err,avg}$ is calculated from a plurality of values $n_{err}$, which values were determined in consecutive first measuring operations 47. In the process, average value $n_{err,avg}$ may be formed as a convex combination of these determined values $n_{err}$, so that average value $n_{err,avg}$ is a sliding average value. The individual values $n_{err}$ may be weighted as desired. For example, in the event that two values $n_{err}$ are to be considered when forming the average value, they may be weighted by ½ in each case. Deviating from the uniform weighting, however, uneven weighting such as weighting at an exponentially decreasing weighting coefficient is conceivable, where values $n_{err}$ from the more distant past are weighted less heavily than values $n_{err}$ of more recent origin. In particular, sliding average value $n_{err,avg}$ may be determined from current value $n_{err}$ and the most recently calculated value $n_{err,avg,prev}$, using the following equation:

$$n_{err,avg} = \alpha \cdot n_{err} + (1-\alpha) \cdot n_{err,avg,prev}.$$

For example, $\alpha=0.5$ may be selected. This results in:

$$n_{err,avg} = \frac{1}{2}(n_{err} + n_{err,avg,prev}).$$

Following step 55, a step 56 is executed, in which a signaling rate r, i.e., the average number $n_{err,avg}$ of error frames 37 in relation to duration t of the measuring signal is calculated taking the duration of measuring interval t into account.

Then, in a step 57, bit error rate BER is calculated as a function of the average number $n_{err,avg}$ of error frames 37, channel occupancy p, and channel capacity c of bus line 15. Signaling rate r corresponds to a bit error rate (bit error per time unit) of bus line 15. For example, bit error rate BER may thus be calculated using the formula $$BER = \frac{r}{p \cdot c}$$

It is of course also possible to determine signaling rate r per transmitted data packets as bit error rate.

In one specific development, which is not shown here, channel occupancy p is not determined, but a constant, specified channel occupancy is used to determine the bit error rate, so that step 53 may be omitted. For instance, assuming a fully occupied bus (=1) at a channel capacity of c=500 kBit/s, for example, and an average signaling rate of r=500 s$^{-1}$, for instance, a bit error rate of BER=10$^{-3}$ results from the above formula.

Step 57 is followed by a procedure 59, in which the communication behavior of node 13 is adapted as a function of bit error rate BER. Method 41 is then executed again by returning to step 45. The number of error frames $n_{err}$ and the number $n_{pl}$ of data frames 33 transmitted without error are thus measured repeatedly and for different intervals.

In procedure 59, system states of node 13 are able to be modified in selective manner on the basis of bit error rate BER. In this context it may be provided to compare a current value of bit error rate BER with threshold values, and to retain or modify the system state of node 13 on the basis of these comparisons. The comparisons may be carried out periodically or in response to a specific query command. It may also be provided that node 13 implements an emergency operation or turns itself off if—or as long as—bit error rate BER is greater than the threshold value.

Figure 5:
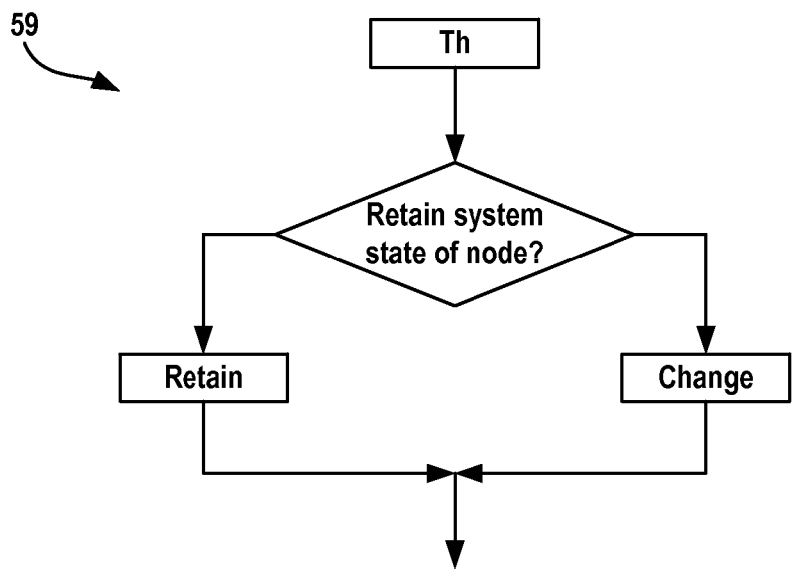
FIG. 5 shows a detail from the flow chart of FIG. 4.

FIG. 5 shows one possible realization of procedure 59. In a step 61, bit error rate BER is compared to a threshold value Th. In a junction 63, depending on comparisons 61, a decision is subsequently made whether the system state of node 13 is to be retained (step 65) or whether a change to a different system state should take place (step 67).

In the specific development shown, all steps of method 41, with the exception of procedure 59, are executed by measuring device 23. Procedure 59 runs on microcontroller 25. In deviation, however, further steps of method 41 may also be executed by microcontroller 25 instead of measuring device 23. For example, microcontroller 25 may conceivably execute steps 53, 55, 56 and 57, which statistically evaluate values $n_{err}$ and $n_{pl}$ acquired in steps 47 and 49, so that the task of measuring device 23 is limited to the acquisition of data but does not extend to the execution of relatively complex calculations for their evaluation.

In the specific development shown, the average bit error rate for all transmission processes 31 is determined in each node 13. In deviation, in another specific development, each node 13 determines bit error rate BER only for the particular transmission processes 31 in which corresponding node 13 transmits a data frame 33. In general, method 41 may be realized in distributed manner such that it is able to be executed on a plurality of nodes 13 or on all nodes 13 of communication system 11.

What is claimed is:

1. A method for operating a communication system having a shared communication channel and multiple nodes which have access to the shared communication channel, comprising:
    monitoring for bit errors in a transmission of a message over the shared communication channel;
    transmitting, when a bit error is detected, a signaling message over the shared communication channel in order to signal the detected bit error; and
    measuring a signaling rate of the signaling message;
    wherein a bit error rate of the shared communication channel is determined as a function of the signaling rate, a channel occupancy of the shared communication channel, and a capacity of the shared communication channel.

2. The method as recited in claim 1, wherein the channel occupancy is determined by measuring a message rate of messages transmitted without error over the shared communication channel.

3. The method as recited in claim 1, wherein the bit error rate is determined by averaging bit error rates of multiple transmissions of messages.

4. The method as recited in claim 1, wherein a bit error rate of a selected transmission process in which the message is transmitted by a selected node is determined as the bit error rate.

5. The method as recited in claim 1, wherein at least one of the signaling rate of the signaling message and the bit error rate is repeatedly determined at predefined intervals over a specified measuring period.

6. The method as recited in claim 5, wherein the measuring interval is specified by a start command for starting the interval and a stop command for ending the interval.

7. The method as recited in claim 1, wherein a communication behavior of at least one node of the communication system is adapted as a function of an evaluation of at least one of the measured signaling rate of the signaling message and the determined bit error rate.

8. The method as recited in claim 7, wherein the communication behavior of at least one node is adapted as a function of a comparison of the bit error rate with a specified threshold value selected from multiple specified threshold values.

9. The method as recited in claim 7, wherein the evaluation is performed periodically.

10. The method as recited in claim 7, wherein the evaluation is performed in response to a specified query command.

11. The method as recited in claim 7, wherein the communication system is a CAN bus system.

12. The method as recited in claim 1, wherein the channel occupancy is a level of utilization of the shared communication channel.

13. The method as recited in claim 1, wherein the channel occupancy is determined from a message length of transmitted messages.

14. The method as recited in claim 1, wherein the channel occupancy is determined from a portion of each of a transmitted message.

15. The method as recited in claim 1, wherein the channel occupancy is at least one of: constant and pre-defined.

16. A communication system, comprising:
    a shared communication channel;
    a plurality of nodes which have access to the shared communication channel, wherein at least one node has a controller configured to (i) monitor for bit errors in a transmission process for transmitting a message over the shared communication channel, and (ii) in the case of a detected bit error, transmit a signaling message in order to signal the detected bit error;
    at least one measuring device configured to measure a signaling rate of the signaling message; and
    a processor configured to determine a bit error rate as a function of the signaling rate, a channel occupancy of the shared communication channel, and a capacity of the shared communication channel.

17. The communication system as recited in claim 16, wherein the at least one measuring device is included in the at least one node.

18. The communication system as recited in claim 16, wherein the at least one measuring device is integrated into the controller of the at least one node.

19. The communication system as recited in claim 16, wherein the at least one measuring device is a separate component configured as ASIC.

* * * * *

UNITED STATES PATENT AND TRADEMARK OFFICE
CERTIFICATE OF CORRECTION

PATENT NO. : 8,566,655 B2  Page 1 of 1
APPLICATION NO. : 12/998110
DATED : October 22, 2013
INVENTOR(S) : Werner et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 300 days.

Signed and Sealed this

Fifteenth Day of September, 2015

Michelle K. Lee
*Director of the United States Patent and Trademark Office*